Oct. 17, 1939.   A. WERME   2,176,846

CLINCH-ON NUT

Filed June 8, 1938

Inventor
Adolph Werme
by C. E. Hammett
Attorney

Patented Oct. 17, 1939

2,176,846

UNITED STATES PATENT OFFICE 2,176,846

CLINCH-ON NUT

Adolph Werme, Worcester, Mass., assignor to Reed & Prince Manufacturing Company, Worcester, Mass., a corporation of Massachusetts Application June 8, 1938, Serial No. 212,476

7 Claims. (Cl. 85—32)

The present invention relates to supporting and holding means and more particularly to the association of securing elements such as nuts and the like with a plate, sheet or panel construction and to securing elements adapted for such association.

An object of the invention is the provision of improved supporting and holding means of this nature.

In many classes of work, it is desirable that securing elements, such as nuts, be attached to and held on metal plates or other parts in such manner that the nuts will be in proper position to receive bolts or screws, and will be held against rotation while the bolts or screws are received therein. The present invention provides a nut which is easily and cheaply manufactured and attached to a metal plate or like supporting means, and is effectively held thereon, and against rotation, for receiving a bolt, screw or other fastening device which may be used, for example, to secure another article or part to the plate.

For a better understanding of the invention, reference may be had to the accompanying drawing, in which one embodiment thereof has been shown for illustrative purposes. In the drawing.

Figure 1:
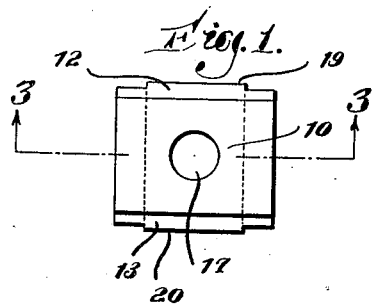
Fig. 1 is a plan view of an improved securing element such as a nut.
Figure 2:
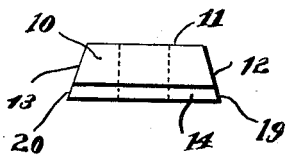
Fig. 2 is a side elevation of the securing element of Fig. 1.

Referring to the drawing, 10 indicates generally a securing element or nut, which is adapted to be attached to a plate, panel or like construction, for example sheet metal, and to receive a screw, bolt or other fastening device. This securing element is intended to be illustrative of any of the well known devices used for this purpose, such as nuts, bushings, grommets, lugs, etc. The securing member or nut 10 is designed so to engage in a preformed opening 8 in a plate 9 that the nut will bear on at least two points of the plate and the plate will also bear on two points of the nut, thus effectively holding the nut in and on the plate.

The nut is provided with shoulders for overlying the plate 9 adjacent the opening 8, and with a projecting portion adapted to enter the opening, said projecting portion advantageously being of substantially the same dimensions as the opening with regard both to the area of the opening and its depth (which is the thickness of the plate). The nut also has beveled edges for angularly engaging at two points under edges of the opening 8 and thereby effectively joining the plate and the nut.

Figure 3:
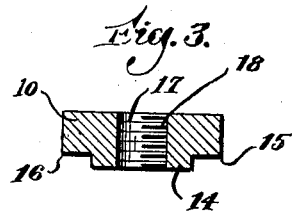
Fig. 3 is a cross section taken on the line 3—3 of Fig. 1.
Figure 4:
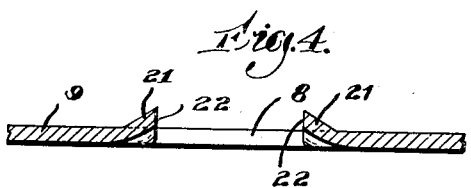
Fig. 4 is a fragmentary cross section of a plate formed with an opening and upstruck edges.

The nut, which may conveniently be rectangular as shown and is provided with an opening 17 with threads 18 therein, comprises a top face 11 from which extend downwardly and outwardly beveled sides 12 and 13. The other two sides of the nut may be of any desired shape and in the drawing are illustrated as perpendicular. The bottom or base of the nut is undercut or recessed on two sides and in a direction transverse of the beveled sides 12 and 13, thus forming a projecting portion 14 and shoulder portions 15 and 16 (Fig. 3) extending outwardly therefrom. By constructing the projecting portion 14 transverse to the beveled sides or faces 12 and 13, the ends of the projecting portion may be formed by a part of the beveled sides at the central portions thereof, and there result two beveled edges 19 and 20 on the projecting portion 14, which edges are preferably of the same vertical thickness as the plate 9 and are suitable for angularly engaging under edges of the opening 8 in the panel 9.

The nut may conveniently be formed by a stamping operation. Or an appropriately formed bar may be made by rolling or extruding and nut blanks of suitable size may be cut therefrom.

Figure 5:
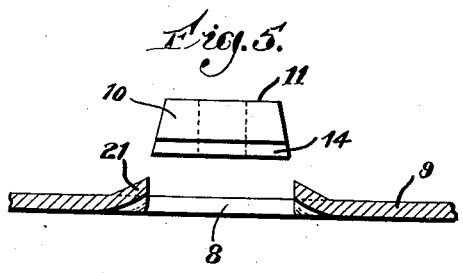
Fig. 5 is a view similar to Fig. 4, with a nut in position to be dropped into the opening in the plate.

The plate 9 may be readily prepared for receiving the nut 10 by stamping or cutting out, as with a die, punch or other suitable tool, an opening 8 which may advantageously be of the same general shape and dimensions as the projecting portion 14 of the nut. This insures that those edges of the projecting portion 14 from which the shoulder portion 15, 16 extend may be dropped into the opening as illustrated in Fig. 5 and be snugly received therein with the shoulder portions overlying the plate 9. The tool used in forming the opening 8 may be so formed and applied in the punching operation as to provide a delayed cutting action or "drag" at two points to produce upstruck edges or tabs 21 in the plate. As the cutting tool passes through the plate, edges 22 are formed on the tabs 21, which edges in the upstanding position of the tabs are substantially vertical but which, upon the tabs being pressed down, as indicated in Figs. 6 and 8, become beveled as compared with the other edges of the opening.

The space between the edges 22 in the upstanding position of the tabs 21 is such that the ends 19, 20 of the projecting portion 14 of the nut will freely pass therethrough.

Figure 6:
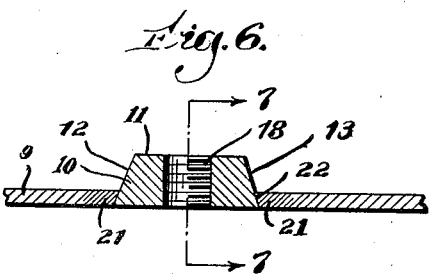
Fig. 6 is a cross section of an assembled plate and nut.
Figure 7:
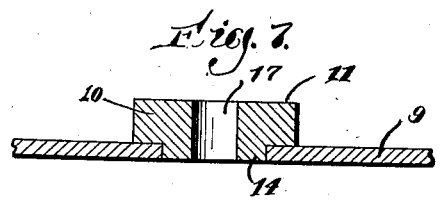
Fig. 7 is a cross section taken on the line 7—7 of Fig. 6.
Figure 8:
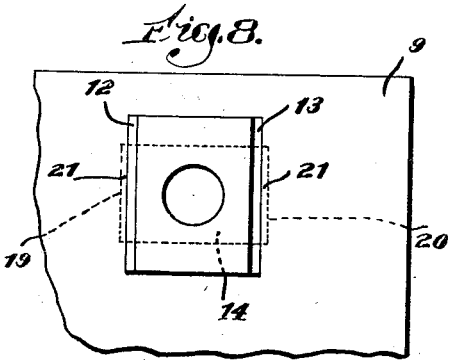
Fig. 8 is a fragmentary plan view of an assembled plate and nut construction.

After a nut 10 has been placed in the opening 8, the tabs 21 may be readily flattened down onto the beveled ends or edges 19, 20 of the nut and into the plane of the plate, with a suitable tool, for example a punch, and in this position the space between the edges 22 has been decreased, thereby locking the nut in and on the plate, and the edges 22 lie against the complementary beveled edges 19 and 20 of the nut, as illustrated in Figs. 6 and 8.

While the nature and advantages of the invention will be readily apparent from the foregoing description, it is obvious that the details herein shown for illustrative purposes may be modified without departing from the spirit or scope of the invention.

I claim:

1. A fastening device adapted for attachment to a plate or the like, said device comprising edge shoulder portions adapted to overlie the surface of the plate, and having two other edge portions which are beveled outwardly toward the face having the shoulder portions, said beveled edge portions adapted to be received in and to bear against the plate to prevent displacement of the device in a direction away from the plate, said shoulder portions preventing displacement of said device in a direction toward the plate.

2. A nut adapted for attachment to a plate or the like, said nut comprising shoulder portions adapted to overlie the surface of the plate and prevent displacement of the nut in a direction toward the plate, said nut further comprising end portions which are beveled outwardly toward the face of the nut which has the shoulder portions, and are adapted to be received and clinched in the plate, whereby the nut may be attached to the plate and displacement of the nut in a direction away from the plate may be prevented.

3. A fastening device comprising a body having two end edges outwardly beveled toward the base of the device, the base being rabbeted along two of its side edges intermediate said widened beveled end edges, thus providing shoulders and a projecting portion disposed between and transversely of the said beveled edges, the ends of said projecting portion forming a part of said beveled edges, whereby said fastening device may be attached to a plate by inserting said projecting portion into an opening in the plate, with said shoulders resting on the surface of the plate, and clinching edges of said opening over said beveled end edges.

4. In combination, a sheet metal panel having an opening therein, said opening presenting at least two sides substantially in the plane of the surface of the panel and two sides bent upwardly above the surface of the panel, whereby the opening is enlarged in the dimension between the upwardly bent edges, and a nut provided with shoulder portions adapted to overlie those sides of the opening which are substantially in the plane of the surface of the panel, said shoulders being spaced from the bottom surface of the nut a distance substantially equal to the thickness of the panel, said nut presenting beveled edges adapted to fit within the upturned edges of the opening in the metal panel and to retain said nut in position in and on said panel when said upturned edges are bent down upon the beveled edges of the nut.

5. In combination, a plate having an opening therein, at least two sides of said opening comprising undercut edges, a nut having its under side recessed to provide oppositely disposed shoulders with a projecting portion of the nut located between said shoulders, said shoulders adapted to support the nut on the plate, said projecting portion of the nut being formed with two outwardly beveled edges, said undercut edges of the opening and said beveled edges of the nut being clinched upon one another.

6. A plate and nut assembly comprising in combination a plate having an opening therein and a nut provided with two edge portions which are beveled outwardly toward the base of the nut, edges of said opening in the plate being clinched against said beveled edges of the nut to hold the nut on the plate, said nut comprising shoulder portions formed adjacent other edges of the nut, said shoulder portions overlying the surface of the plate.

7. In combination, a plate having an opening therein, said opening provided with an edge bent to a closed position to decrease the diameter of the opening, and a fastening device provided with a clinching surface positioned in said opening in the plate and oppositely disposed shoulders bearing against a surface of said plate, said fastening device being secured on said plate and in said opening by bending said edge of the opening over said clinching surface of the nut, the part of said fastening device which extends above the surface of said plate being of less dimension, measured in a direction between said clinching edge and the opposite edge of the opening, than the corresponding dimension of the opening in the plate.

ADOLPH WERME.